(12) United States Patent
Becher et al.

(10) Patent No.: US 11,265,153 B2
(45) Date of Patent: Mar. 1, 2022

(54) VERIFYING A RESULT USING ENCRYPTED DATA PROVIDER DATA ON A PUBLIC STORAGE MEDIUM

(71) Applicant: SAP SE, Walldorf (DE)

(72) Inventors: Kilian Becher, Dresden (DE); Axel Schroepfer, Borthen (DE); Mirko Schaefer, Dresden (DE)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 16/848,985

(22) Filed: Apr. 15, 2020

(65) Prior Publication Data

US 2021/0328778 A1    Oct. 21, 2021

(51) Int. Cl.
*H04L 29/06* (2006.01)
*H04L 9/08* (2006.01)
*H04L 9/06* (2006.01)
*H04L 9/00* (2022.01)

(52) U.S. Cl.
CPC ............ *H04L 9/0825* (2013.01); *H04L 9/008* (2013.01); *H04L 9/0637* (2013.01); *H04L 9/085* (2013.01); *H04L 2209/38* (2013.01)

(58) Field of Classification Search
CPC ..... H04L 9/0825; H04L 9/008; H04L 9/0637; H04L 9/085; H04L 2209/38
See application file for complete search history.

(56) References Cited

U.S. PATENT DOCUMENTS 9,003,204 B2   4/2015   Haerterich et al.
9,009,089 B1   4/2015   El Defrawy et al.
9,342,707 B1   5/2016   Kerschbaum et al.
9,537,838 B2 * 1/2017   Hang .................. H04L 63/0464
9,547,720 B2   1/2017   Hang et al.
9,607,161 B2   3/2017   Haerterich et al.
10,162,858 B2 * 12/2018 Kerschbaum ..... G06F 16/24542
10,630,468 B1   4/2020   Wang et al.
(Continued)

OTHER PUBLICATIONS

Becher et al., "Efficient Cloud-based Secret Shuffling via Homomorphic Encryption." arXiv preprint arXiv:2002.05231, Feb. 12, 2020, 11 pages.

*Primary Examiner* — Chau Le
*Assistant Examiner* — Andrew Suh
(74) *Attorney, Agent, or Firm* — Fish & Richardson P.C.

(57) ABSTRACT

The present disclosure involves systems, software, and computer implemented methods for verifying encrypted data provider data on a public storage medium. One example method includes receiving a verification request to verify encrypted data provider data stored on a public storage medium. Public storage medium entries relevant to the verification request are identified and retrieved. A homomorphic cryptosystem is used to homomorphically calculate a first encrypted target function result based on encrypted data provider data. The homomorphic cryptosystem and a verifying entity cryptosystem are used to re-encrypt the first encrypted target function result to generate a second encrypted target function result that is encrypted under the verifying entity cryptosystem and not encrypted under the homomorphic cryptosystem. The second encrypted target function result is provided to the verifying entity, to enable the verifying entity to decrypt the second encrypted target function result and verify a target function result.

20 Claims, 10 Drawing Sheets

(56) References Cited

U.S. PATENT DOCUMENTS

| | | |
|---|---|---|
| 11,133,922 B1 | 9/2021 | Becher et al. |
| 2014/0007250 A1 | 1/2014 | Stefanov et al. |
| 2015/0341174 A1 | 11/2015 | Mandal et al. |
| 2017/0012970 A1 | 1/2017 | Mandal et al. |
| 2017/0085382 A1 | 3/2017 | Kamakari et al. |
| 2017/0142109 A1 | 5/2017 | Mandal et al. |
| 2018/0205707 A1 | 7/2018 | Bellala et al. |
| 2020/0177364 A1 | 6/2020 | Zhou et al. |
| 2020/0401726 A1 | 12/2020 | Lim et al. |
| 2021/0328762 A1 | 10/2021 | Becher et al. |

* cited by examiner

| Production Step | Blockchain Entry Written by | Blockchain Entry Content | Production Step Description |
|---|---|---|---|
| Mining 502 | Large-scale miner 504 · · · · · · 506 | · Miner<br>· Mine<br>· Ore lot number (out)<br>· Amount of ore<br>· Type of ore (L/A) | · LSM mines cobalt ore<br>· ASM mines cobalt ore on behalf of LSM |
| Trading 508 | Trader 510 · · · · · 512 | · Trader<br>· Miner<br>· Ore lot numbers (in)<br>· Ore lot number (out)<br>· Amount of ore | · Trader buys different lots of L-cobalt ore and A-cobalt ore from different LSMs<br>· Trader combines lots, gets lot with particular L-to-A-ore ratio |
| Smelting 514 | Smelter 516 · · · · · · 518 | · Smelter<br>· Trader<br>· Ore lot numbers (in)<br>· Cobalt lot number (out)<br>· Amount of cobalt<br>· Purity of cobalt | · Smelter buys different lots of ore from different traders<br>· Smelter turns cobalt ore of different ore lots into cobalt of low purity |
| Refining 522 | Refiner 520 · · · · · · 524 | · Refiner<br>· Smelter<br>· Cobalt lot numbers (in)<br>· Cobalt lot number (out)<br>· Amount of cobalt<br>· Purity of refined cobalt | · Refiner buys different lots of cobalt from different smelters<br>· Refiner purifies cobalt (e.g., by removing cinder) |
| Manufacturing 526 | Manufacturer 528 · · · · · · · 530 | · Manufacturer<br>· Refiner<br>· Cobalt lot numbers (in)<br>· Product lot number<br>· Purity of cobalt<br>· Amount of cobalt<br>· L-to-A-cobalt ratio (claim) | · Manufacturer claims particular L-to-A-cobalt ratio of the cobalt used in a product lot |

Privacy-preserving Provenance Verification — 702

Protocol Specification

Block creation — 704

1.1 $P_i: y_j = E_{P_i}(x_j)$ — 708

Verification — 706

2.1 $C \rightarrow R_1: f(\cdot)$ — 710

2.2 $R_1: (..., E_{R_2}(E_{P_i}(x_j)), ...)$ — 712

2.3 $R_1: (..., E_{R_2}(x_j) = R(D_{P_i}(\cdot), E_{R_2}(E_{P_i}(x_j)), E_{R_2}(sk_{P_i})), ...)$ — 714

2.4 $R_1 \rightarrow A: (..., E_{R_2}(x_j), ...)$ — 716

2.5 $A: E_{R_2}(\rho) = f(..., E_{R_2}(x_j), ...)$ — 718

2.6 $A: E_{R_2}(E_C(\rho)) = R(E_C(\cdot), E_{R_2}(\rho), E_{R_2}(sk_C))$ — 720

2.7 $A \rightarrow R_2: E_{R_2}(E_C(\rho))$ — 722

2.8 $R_2: E_C(\rho) = D_{R_2}(E_{R_2}(E_C(\rho)))$ — 724

2.9 $R_2 \rightarrow C: E_C(\rho)$ — 726

2.10 $C: \rho = D_C(E_C(\rho))$ — 728

FIG. 7

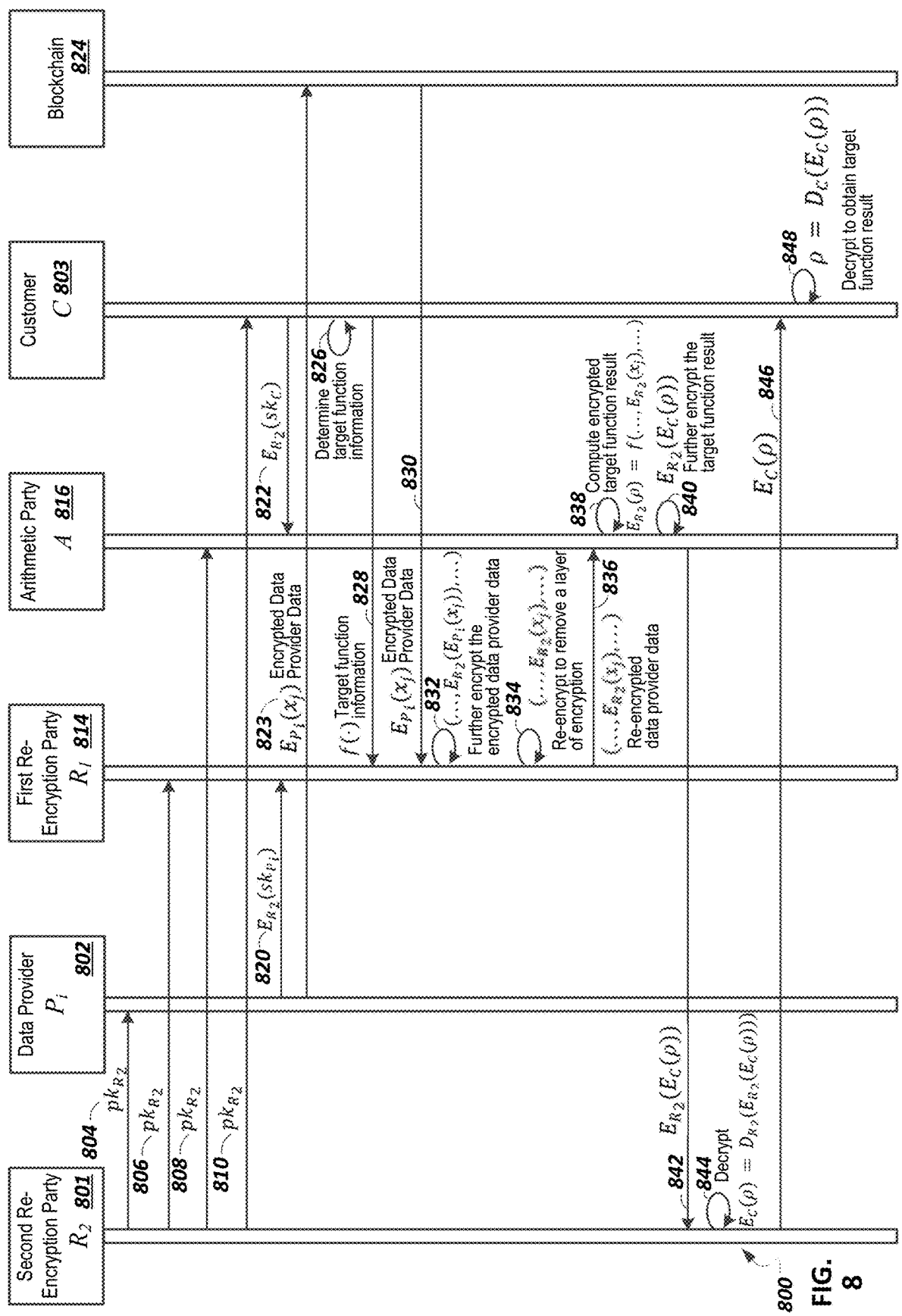

VERIFYING A RESULT USING ENCRYPTED DATA PROVIDER DATA ON A PUBLIC STORAGE MEDIUM

TECHNICAL FIELD

The present disclosure relates to computer-implemented methods, software, and systems for verifying encrypted data provider data on a public storage medium.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for a particular entity, which centrally controls read and write permissions. A consortium blockchain network is provided for a select group of entities, which control the consensus process, and includes an access control layer.

SUMMARY

The present disclosure involves systems, software, and computer implemented methods for verifying encrypted data provider data on a public storage medium. An example method includes: receiving, from each of multiple data providers, a data-provider-specific encrypted secret key; receiving, from a verifying entity, an encrypted verifier secret key; receiving, from the verifying entity, target function information that indicates which entries of a public storage medium include data to be used for a verification of data provider data; using the target function information to identify first entries to be used for verification; retrieving, from the public storage medium, first encrypted data-provider-specific data, from the identified first entries; further encrypting the first encrypted data-provider-specific data to generate doubly-encrypted data-provider-specific data that is encrypted by both the data-provider-specific cryptosystem and the homomorphic cryptosystem; and re-encrypting, using the homomorphic cryptosystem, the doubly-encrypted data-provider-specific data to generate second encrypted data-provider-specific data that is encrypted by the homomorphic cryptosystem and no longer encrypted by the data-provider-specific cryptosystem; homomorphically computing a first encrypted target function result using the second encrypted data-provider-specific data, wherein the first encrypted target function result is encrypted using the homomorphic cryptosystem; re-encrypting the first encrypted target function result to generate a doubly-encrypted target function result that is encrypted by both the homomorphic cryptosystem and the verifier cryptosystem; decrypting, using the homomorphic cryptosystem, the doubly-encrypted target function result to generate a second encrypted target function result that is encrypted by the verifier cryptosystem and no longer encrypted by the homomorphic cryptosystem; and providing the second encrypted target function result to the verifying entity to enable the verifying entity to decrypt the second encrypted target function result using the verifier cryptosystem and verify a target function result.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 illustrates example blockchain entries for a cobalt mining and purification process.

FIG. 7 illustrates a protocol specification for a privacy-preserving provenance verification protocol.

FIG. 8 is a swim lane diagram of an example method for verifying encrypted data provider data on a public storage medium.

DETAILED DESCRIPTION

Figure 1:
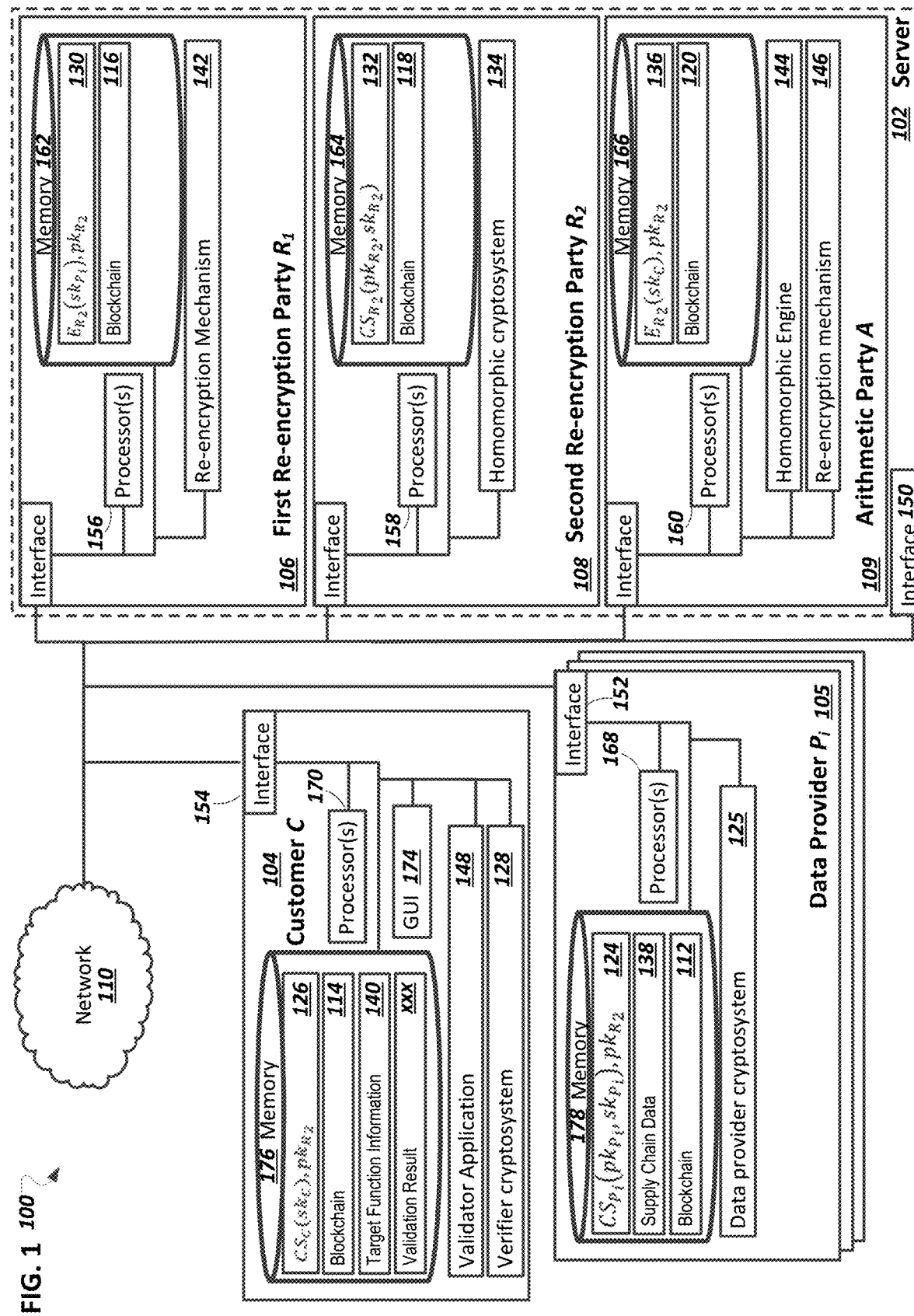
FIG. 1 is a block diagram illustrating an example system for verifying encrypted data provider data on a public storage medium.

Some supply chains can have many participants. For example, cobalt is a main ingredient for batteries, such as in electric cars. A cobalt supply chain can start with large-scale mining (LSM) companies mining cobalt ore with heavy machinery. Once a cobalt mine becomes uneconomical, the LSM might grant a right to mine remaining ore to artisanal miners (ASM). Some ASMs may mine cobalt ore with fewer safety measures than those typically used for LSM, which can cause higher risks of injury or death for ASM. Accordingly, ASM cobalt ore may be considered by some to be at least partially immoral and thereby undesirable for a majority of consumers. To alieve consumer concerns, manufacturers can claim an ASM-to-LSM-cobalt ratio for their products, such as "Less than 20% ASM cobalt" or "0% ASM cobalt".

However, it can be hard for a customer to verify such a claim without specific information about a product's supply chain. A blockchain, or other public storage medium, can persistently carry information about each individual transaction of a cobalt supply chain and therefore allow for tracking of a product's lifecycle from cobalt mining to the product's manufacturing. As any involved party can read from the blockchain, verifications of the transactions can be straightforward. A customer, or any verifier, can verify whether a provenance of the cobalt used in a product is as claimed by the supplier. To do so, the customer can traverse the blockchain backwards and read any entry in a chain of related entries, such as from a product to its components to cobalt-ore lots. Such blockchain scenarios can allow for transparency and increase customers' trust.

However, a blockchain-based verification requires supply chain data that some parties may want to keep private. At least some supply chain data may be considered confidential, for example if certain information leaks business relations, prices, amounts, recipes, etc. To not put a supplier's competitive advantage at risk, such data might not be published in a blockchain in some examples. Additionally, companies may be reluctant to participate in scenarios in which sensitive data is published, and may therefore decline an opportunity for providing verification mechanisms based on published data.

To alleviate privacy concerns, a cryptographic protocol can be used that encrypts supply chain data before storing the supply chain data on a blockchain, thereby ensuring privacy. Furthermore, homomorphic encryption (HE) technologies can be applied during verification. Homomorphic encryption can allow for arithmetic computations on encrypted blockchain entries which can enable a same set of verifications as can be performed for unencrypted blockchain entries. Arithmetic operations performed on encrypted entries can reduce leakage of sensitive information.

In further detail, the protocol can include solutions for challenges posed by applying homomorphic encryption to blockchain data. Homomorphic encryption can be applied, for example, as a layer on top of the blockchain. A sophisticated construction can be used, to counter an assumption that parties may be considered to be mutually distrustful. In general, a setup can be constructed in which each supply-chain party has its own individual key that can be used to encrypt data. Individual keys can prevent parties from reading and decrypting each other's values stored on the blockchain. Subsequent steps of the protocol can include re-encrypting data under a common key, performing verification computations, re-encrypting verification result(s), and eventually decrypting the verification results. A verification result can be a ratio between cobalt ore mined by ASMs and cobalt ore mined by LSMs.

The protocol can utilize proxy re-encryption to provide mathematical privacy guarantees while still allowing for (blockchain-based) cobalt provenance verification. Compared to existing blockchain-based solutions, the protocol ensures not only transparency but also privacy, by building onto fully homomorphic encryption schemes.

Although cobalt mining is used as an illustrative example, the protocol can be used for other situations, such as other supply chain or sensitive data scenarios, for other data sets. The protocol can be used when multiple parties who are least partially mutually distrustful each contribute blockchain data that can be used for a subsequent verification. Although supply chain data is mentioned, verification of other data can be performed using the verification protocol described herein. Any general verification function can be used that arithmetically evaluates data provider data. Although blockchain data is mentioned, the approach can be used with publicly available data, such as stored in distributed ledgers, public databases, or other public storage mediums. Generally, the verification protocol can enable verification, through homomorphic evaluation of the verification function, of encrypted public storage medium data, without revealing underlying sensitive information.

FIG. 1 is a block diagram illustrating an example system 100 for verifying encrypted data provider data on a public storage medium. Specifically, the illustrated system 100 includes or is communicably coupled with a server 102, a verifier entity (e.g., customer) computing device 104, data provider computing device(s) 105, a first re-encryption party computing device 106, a second re-encryption party computing device 108, an arithmetic party computing device 109, and a network 110. Although shown separately, in some implementations, functionality of two or more systems or servers may be provided by a single system or server. For example, the server 102 is shown optionally, since the first re-encryption party computing device 106, the second re-encryption party computing device 108, and the arithmetic party computing device 109 may be part of a same system (e.g., the server 102) or may be implemented as separate devices/systems. Additionally, in some implementations, the functionality of one illustrated system, server, or component may be provided by multiple systems, servers, or components, respectively. When the first re-encryption party computing device 106, the second re-encryption party computing device 108, and the arithmetic party computing device 109 are part of a same server, each device (or corresponding component) can be executed in separate and independent secure hardware (e.g., using Trusted Execution Environments, Trusted Platform Modules, or secure Co-Processors). As discussed below, the verifier entity computing device 104 and the data provider computing device(s) 105 may each be a client computing device, an on-premise server computing device, or a cloud computing device.

Some or all of the verifying entity computing device 104, the data provider computing devices 105, the first re-encryption party computing device 106, the second re-encryption party computing device 108, and the arithmetic party computing device 109 may be nodes of a blockchain network (or may otherwise have access to a blockchain ledger). For example, the verifying entity computing device 104, the data provider computing devices 105, the first re-encryption party computing device 106, the second re-encryption party computing device 108, and the arithmetic party computing device 109 can access blockchain ledgers 112, 114, 116, 118, or 120, respectively. As another example, the server 102 may be a blockchain node (e.g., if the server 102 includes multiple sub components).

A verifying entity may want to check whether a claim made about a product holds true. For instance, the verifying entity may be a purchasing customer, a regulator, or some other type of entity. A verifier may want to verify a particular target function $\rho = f(\ldots x_j, \ldots)$. In a cobalt mining and purification supply chain, for example, a customer may want to compute the ratio between ASM-cobalt ore and LSM-cobalt ore that was used in the respective product. For a cobalt provenance verification, the verifying entity can assume that each blockchain entry of a current blockchain ledger includes lot numbers that were used in a respective production step. Therefore, the verifying entity can determine which lots were used by a manufacturer, refiners, smelters, and traders as well as which ASM or LSM mined the cobalt ore. Consequently, a target function can be a ratio between the sum of the amounts of ASM-cobalt ore ($\ldots, x_{ASM_j}, \ldots$) and the sum of the amounts of LSM-cobalt ore ($\ldots, x_{LSM_j}, \ldots$). Accordingly, a target function can be formalized as follows.

$$\rho = f(\ldots, x_j, \ldots) = \frac{\sum_j x_{ASM_j}}{\sum_j x_{LSM_j}}$$

As described below, the target function can be evaluated homomorphically, ensuring privacy.

Various key storage and key distribution can occur. For instance, each data provider computing device 105 can have access to different keys 124, including a data provider public key $pk_{P_i}$ and a data provider secret key $sk_{P_i}$ of a data provider cryptosystem $CS_{P_i}$ 125, and a re-encryption-party public key $pk_{R_2}$. The verifier entity computing device 104 can have access to different keys 126, including a verifier secret key $sk_C$ of a verifier cryptosystem $CS_C$ 128, and the re-encryption-party public key $pk_{R_2}$. The first re-encryption party computing device 106 can include different keys 130, including the re-encryption-party public key $pk_{R_2}$ and an encrypted data provider secret key $E_{R_2}(sk_{P_i})$ for each data provider. The second re-encryption computing device 108 can include keys 132 that include the public re-encryption-party key $pk_{R_2}$ and a secret re-encryption-party key $sk_{R_2}$, of a homomorphic cryptosystem 134. The arithmetic party computing device 109 can include keys 136 that include the public re-encryption-party key $pk_{R_2}$ and an encrypted verifier secret key $E_{R_2}(sk_C)$.

As a summary of the verification protocol, data provider computing devices 105 can encrypt, e.g., supply chain data 138 and store encrypted data provider data on the blockchain. The verifying entity computing device 105 can determine, e.g., from the blockchain ledger 114 (or otherwise from the blockchain), target function information 140 that indicates which entries of the blockchain include data to be used for verification. The verifying entity computing device 105 can send the target function information 140 to the first re-encryption party computing device 106. The first re-encryption party computing device 106 can use the target function information 140 to identify blockchain entries to be used for verification and retrieve encrypted data-provider-specific data from the blockchain.

The first re-encryption party computing device 106 can use the retrieved entries to create data that is encrypted by both a data provider cryptosystem (e.g., the data provider cryptosystem 125) and the homomorphic cryptosystem 134, and use a re-encryption mechanism 142 to generate data that is encrypted by the homomorphic cryptosystem 134 and no longer encrypted by the data-provider-specific cryptosystem. The first re-encryption party computing device 106 can send the data that is encrypted by the homomorphic cryptosystem 134 to the arithmetic party computing device 109. The arithmetic party computing device 109 can use a homomorphic engine 144 to homomorphically compute an encrypted target function result that is encrypted by the homomorphic cryptosystem 134, and use a re-encrypt mechanism 146 to generate a target function result that is encrypted by both the homomorphic cryptosystem 134 and the verifier cryptosystem 128. The arithmetic party computing device 109 can send a doubly-encrypted target function result to the second re-encryption party computing device 108.

The second re-encryption party computing device 108 can use the homomorphic cryptosystem 134 to decrypt the target function result that has double encryption, to generate an updated target function result that is encrypted by the verifier cryptosystem 128 and no longer encrypted by the homomorphic cryptosystem 134. The updated target function result can be provided to the verifying entity computing device 104, for decryption by the verifier cryptosystem 128, to generate a plaintext target function result, that can be used by a validator application 148 to verify the target function result.

As used in the present disclosure, the term "computer" is intended to encompass any suitable processing device. For example, although FIG. 1 illustrates a single server 102 and a single verifying entity computing device 104, the system 100 can be implemented using a single, stand-alone computing device, two or more servers 102, or multiple verifying entity computing devices. Indeed, the server 102, the verifier entity computing device 104, the data provider computing device(s) 105, the first re-encryption party computing device 106, the second re-encryption party computing device 108, and the arithmetic party computing device 109 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the illustrated computing devices may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154, and other illustrated interfaces, are used by the server 102, the verifying entity computing device 104, and the data provider computing devices 105, and other computing devices, respectively, for communicating with other systems in a distributed environment—including within the system 100—connected to the network 110. Generally, the interfaces 150, 152, and 154 each comprise logic encoded in software and/or hardware in a suitable combination and operable to communicate with the network 110. More specifically, the interfaces 150, 152, and 154 may each comprise software supporting one or more communication protocols associated with communications such that the network 110 or interface's hardware is operable to communicate physical signals within and outside of the illustrated system 100. If the server 102 is implemented as separate computing devices, each respective computing device can have its own respective interface for interfacing with the network 110.

The server 102 includes one or more processors (e.g., as a standalone system or as implemented as multiple cooperating systems). For example, the server 102 can be comprised of processors 156, 158, and 160 of the first re-encryption computing device 106, the second re-encryption computing device 108, and the arithmetic party computing device 109, respectively. Each processor 156, 158, or 160 may be a central processing unit (CPU), a blade, an application specific integrated circuit (ASIC), a field-programmable gate array (FPGA), or another suitable component. Generally, each processor 156, 158, or 160 executes instructions and manipulates data to perform the operations of the server 102 (or a respective sub-component). Specifically, each processor 156, 158, or 160 executes the functionality required to receive and respond to requests from the verifying entity computing device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 (or respective sub systems) includes memory 162, 164, and/or 166. The memories 162, 164, or 166 may include any type of memory or database module and may take the form of volatile and/or non-volatile memory including, without limitation, magnetic media, optical media, random access memory (RAM), read-only memory (ROM), removable media, or any other suitable local or remote memory component. The memories 162, 164, or 166 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102 (or a respective sub system).

The verifying entity computing device 104 and the data provider computing devices 105 may each generally be any computing device operable to connect to or communicate with the server 102 via the network 110 using a wireline or wireless connection. In general, the verifying entity computing device 104 and the data provider computing devices 105 each comprise an electronic computer device operable to receive, transmit, process, and store any appropriate data associated with the system 100 of FIG. 1. The verifying entity computing device 104 and the data provider computing devices 105 can each include one or more server or client applications, including the validator application 148. In general, an application used within the system 100 can be any type of application that allows a respective computing device to request and view content on the device. In some implementations, an application can use parameters, metadata, and other information received at launch to access a particular set of data from the server 102. In some instances, an application may be an agent or client-side version of the one or more enterprise applications running on an enterprise server (not shown).

The verifying entity computing device 104 and the data provider computing devices 105 respectively include processor(s) 168 or processor(s) 170. Each processor 168 or 170 may be a central processing unit (CPU), an application specific integrated circuit (ASIC), a field-programmable gate array (FPGA), or another suitable component. Generally, each processor 168 or 170 executes instructions and manipulates data to perform the operations of the respective device. Specifically, each processor 168 or 170 executes the functionality required to send requests to the server 102 and to receive and process responses from the server 102.

The verifying entity computing device 104 and the data provider computing devices 105 are each generally intended to encompass any computing device such as a laptop/notebook computer, wireless data port, smart phone, personal data assistant (PDA), tablet computing device, server computing device (s0, IoT (Internet of Things) device, one or more processors within these devices, or any other suitable processing device. For example, the verifying entity computing device 104 and the data provider computing devices 105 may each comprise a computer that includes an input device, such as a keypad, touch screen, or other device that can accept user information, and an output device that conveys information associated with the operation of the server 102, or the respective device itself. Visual information can be presented on a GUI (Graphical User Interface) 174, for example.

The GUI 174 interfaces with at least a portion of the system 100 for any suitable purpose, including generating a visual representation of the validator application 148. In particular, the GUI 174 may be used to view and navigate various Web pages. Generally, the GUI 174 provides a respective user with an efficient and user-friendly presentation of business data provided by or communicated within the system. The GUI 174 can include a plurality of customizable frames or views having interactive fields, pull-down lists, and buttons operated by the user. The GUI 174 may include any suitable graphical user interface, such as a combination of a generic web browser, intelligent engine, and command line interface (CLI) that processes information and efficiently presents the results to the user visually.

Memory 176 and memory 178 included in the verifying entity computing device 104 and the data provider computing devices 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 176 and the memory 178 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of verifying entity computing devices 104 and data provider computing devices 105 associated with, or external to, the system 100. For example, while the illustrated system 100 includes one verifying entity computing device 104, alternative implementations of the system 100 may include multiple verifying entity computing devices 104 communicably coupled to the server 102 and/or the network 110, or any other number suitable to the purposes of the system 100. Additionally, there may also be one or more additional verifying entity computing devices 104 and/or data provider computing devices 105 external to the illustrated portion of system 100 that are capable of interacting with the system 100 via the network 110. Further, the term "client", "client device" and "user" may be used interchangeably as appropriate without departing from the scope of this disclosure. Moreover, while the verifying entity computing device 104 and the data provider computing devices 105 may be described in terms of being used by a single user, this disclosure contemplates that many users may use one computer, or that one user may use multiple computers.

Figure 2:
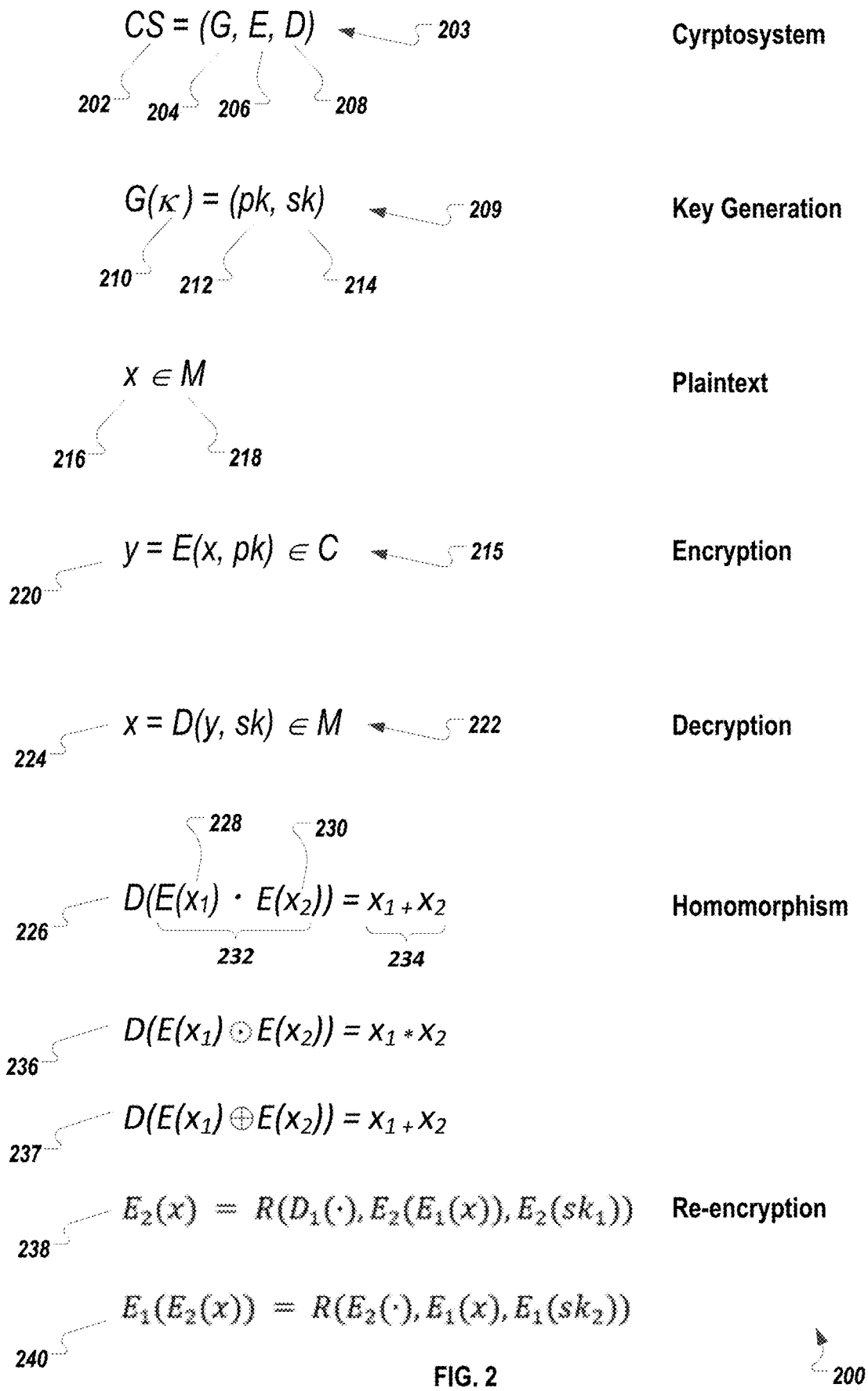
FIG. 2 illustrates mathematical constructs for homomorphic operations and re-encryption.

FIG. 2 illustrates mathematical constructs 200 for homomorphic operations and re-encryption. A cryptosystem CS 202 can be defined as a tuple (G, E, D) 203 that includes three polynomial-time algorithms, including a probabilistic key-generation algorithm G 204, a probabilistic encryption algorithm E 206, and a decryption algorithm D 208.

As illustrated in an equation 209, the probabilistic key-generation algorithm G 204 can accept as input a security parameter K 210 and can output a public encryption key pk 212 and a secret decryption key sk 214. As illustrated in an equation 215, the probabilistic encryption algorithm E 206 can accept as input a plaintext x 216, where the plaintext x 216 is included in a plaintext space M 218 (e.g., x∈M). The probabilistic encryption algorithm E 206 can also accept as input the public encryption key pk 212. The probabilistic encryption algorithm E 206 can output a ciphertext y 220, with y=E(x, pk)∈C, where C denotes a ciphertext space. Alternatively, the probabilistic encryption algorithm E 206 can also accept as input the secret encryption key sk 214 and output a ciphertext y 220, with y=E(x,sk)∈C, where C denotes a ciphertext space. As illustrated in an equation 222, the decryption algorithm D 208 can accept as input a ciphertext y∈C and the secret key sk 214. The decryption algorithm D 208 can output a plaintext x 224, with x=D (y, sk)∈M. For simplification purposes, an encryption of x∈M under a cryptosystem CS=(G, E, D) for pk or sk can be denoted by y=E(x). Similarly, a decryption of y∈C for sk can be denoted by x=D(y).

Homomorphic encryption (HE) schemes, can allow for computations on ciphertexts. In general, homomorphic cryptosystems enable encryption of data and computations on the encrypted data, for example. A formula 226 illustrates additive homomorphic properties of an example cryptosystem. In the additive homomorphic Paillier cryptosystem, for example, if both a first plaintext $x_1$ 228 and a second plaintext $x_2$ 230 are encrypted with a same public key, and the encryptions multiplied (e.g., to form a product 232), then a decryption of the product 232 is equal to a sum 234 of the two plaintexts. Although multiplication is described another operation, other than multiplication, can be used.

A cryptosystem can also be referred to as homomorphic if applying an operation ⊙ to ciphertexts $E(x_1)$ and $E(x_2)$ yields a ciphertext E(y) of the result $y=x_1*x_2$ of a corresponding homomorphic operation*applied to the plaintexts $x_1$ and $x_2$. This can be formalized as shown in a formula 236. Similarly, additive homomorphism can be formalized as shown in a formula 237. That is, a cryptosystem can be referred to as homomorphic if applying an operation ⊕ to ciphertexts $E(x_1)$ and $E(x_2)$ yields a ciphertext E(y) of the result $y=x_1+x_2$ of a corresponding homomorphic operation+ applied to the plaintexts $x_1$ and $x_2$. Fully homomorphic encryption (FHE) schemes typically provide addition and multiplication of the underlying plaintexts given only the corresponding ciphertexts.

Homomorphic systems can also support re-encryption. Re-encryption is a process of transforming a ciphertext $y=E_1(x)$ encrypted under a cryptosystem $CS_1(G_1, E_1, D_1)$ into a ciphertext of the same plaintext, encrypted under a different cryptosystem $CS_2$ ($G_2, E_2, E_2$), with the help of a tag τ. A proxy (one-way) re-encryption scheme based on fully homomorphic encryption can be described as follows. A tag $τ=E_2 (sk_1)$ can be defined as a secret key $sk_1$ of $CS_1$ encrypted under $CS_2$. A transformation can be performed, including a homomorphic evaluation of a decryption function $D_1(•)$ with inputs $E_2 (y)=E_2 (E_1(x))$ and $τ=E_2 (sk_1)$, producing a result $y'=E_2(x)$, which is the plaintext x encrypted only under $CS_2$. Such a re-encryption function can be denoted by R(•) and can be formalized as shown in formula 238.

Re-encryption allows a re-encryption proxy R with access to ciphertexts of a party $P_1$ encrypted under an asymmetric fully homomorphic cryptosystem $CS_1$ to additionally encrypt these ciphertexts under a symmetric cryptosystem $CS_2$ of another party $P_2$ without having access to $sk_2$. In further detail, assume R is given a (secret) key $sk_2$ of $CS_2$ ($G_2, E_2, D_2$) encrypted under $CS_1(G_1, E_1, D_1)$, i.e., $E_1(sk_2)$. To encrypt an input x under $sk_2$, R can first encrypt x under $CS_1$, i.e., $E_1$ (x). Then, R can homomorphically evaluate the encryption function $E_2$ (•) on the encrypted input $E_1$ (x) and the encrypted key $E_1(sk_2)$ to obtain x encrypted under both $CS_1$ and $CS_2$, i.e., $E_1$ ($E_2(x)$). This can be formalised as shown in formula 240. Specific uses of homomorphism and re-encryption are described below.

Figure 3:
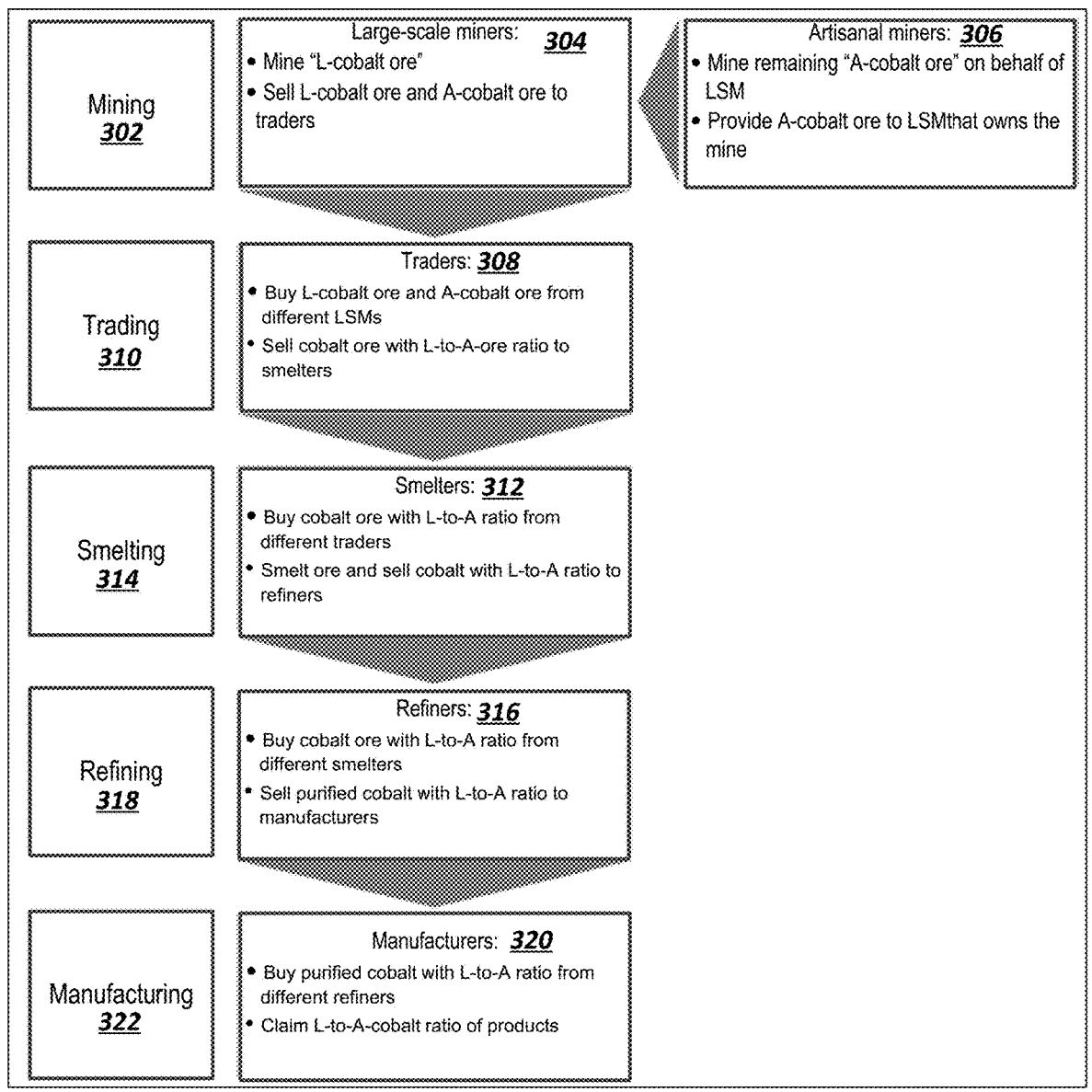
FIG. 3 illustrates an overview of a mining and purification process for cobalt, as an example supply chain.

FIG. 3 illustrates stages 300 of a mining and purification process for cobalt, as an example supply chain. In a mining stage 302, large-scale miners LSM 304 mine cobalt ore (referred to as "L-cobalt ore") using heavy machinery. The LSM 304 allow artisanal miners (ASM) 306 to mine remaining ore (referred to as "A-cobalt ore") on behalf of a given LSM 304. For example, an ASM 306 can provide A-cobalt-ore to a LSM 304 that owns a mine. The LSM 304 can sell L-cobalt ore and A-cobalt ore to traders 308.

For instance, in a trading stage 310, a given trader 308 can buy L-cobalt ore and A-cobalt ore from different LSMs 304. The trader 308 generally cannot tell, by strictly examining the purchased cobalt, whether a given portion of cobalt is L-cobalt ore or A-cobalt ore. The traders 308 can sell cobalt ore with a L-to-A ore ratio to smelters 312.

For example, in a smelting stage 314, a smelter 312 can buy cobalt ore with respective L-to-A ore ratios from different traders 308. The smelters 312 can smelt ore and sell cobalt with an overall L-to-A cobalt ratio to refiners 316.

For example, in a refining stage 318, a refiner 316 can buy cobalt with a L-to-A ratio from different smelters 312. The refiner 316 can refine the cobalt and sell purified cobalt with a L-to-A cobalt ratio to manufacturers 320.

For instance, in a manufacturing stage 322, a manufacturer 320 can buy purified cobalt with respective L-to-A ratios from different refiners 316. The manufacturer 320 can produce a product (for example, a car battery) and claim a particular L-to-A ratio for the product.

Figure 4:
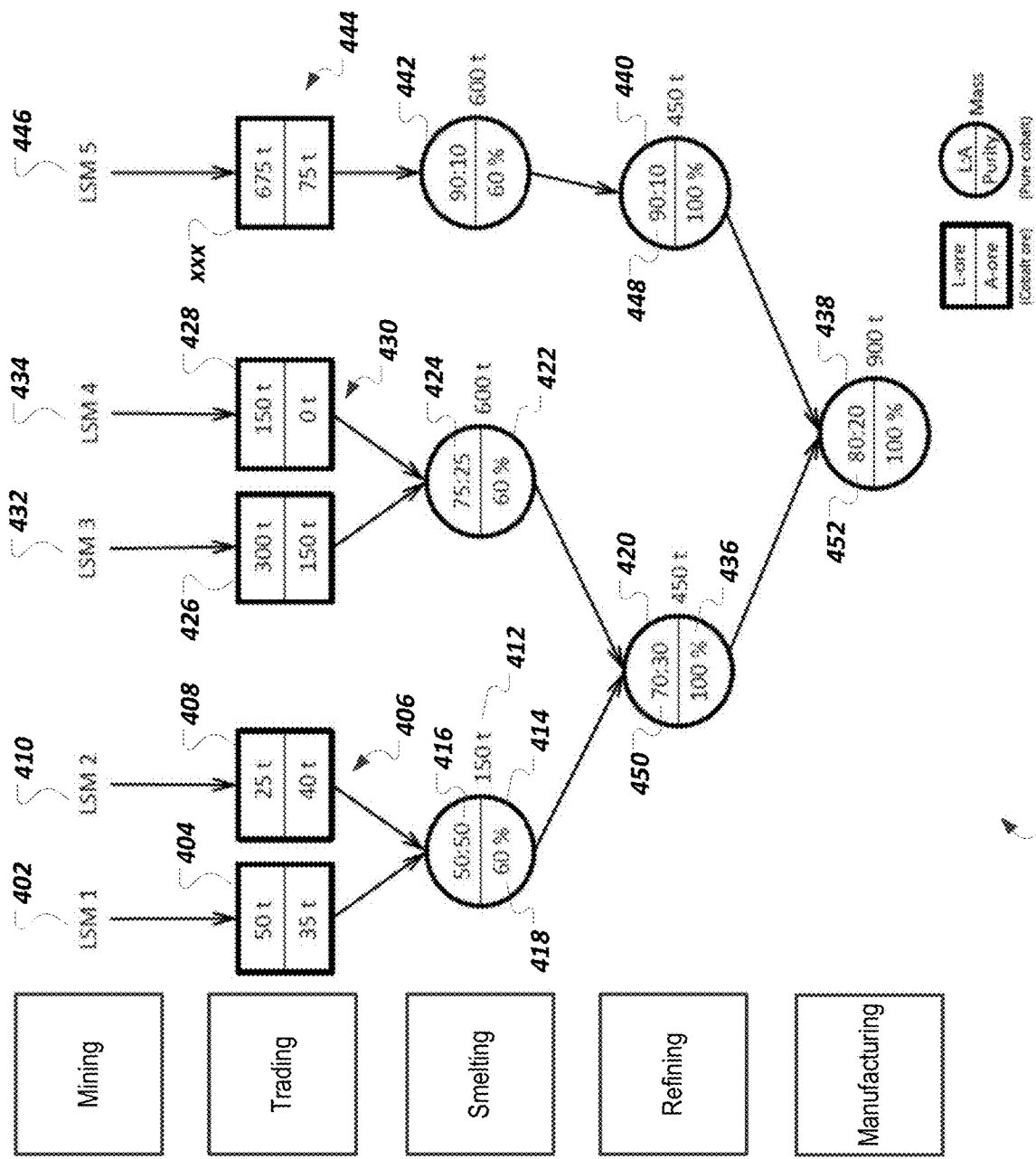
FIG. 4 illustrates an example supply-chain graph for the mining and purification process for cobalt starting from cobalt ore lots.

FIG. 4 illustrates an example supply-chain graph for the mining and purification process for cobalt starting from cobalt ore lots. A first LSM 402 can sell a combination 404 of fifty tons of L-cobalt ore and thirty five tons of A-cobalt ore to a first trader 406. The first trader 406 can also purchase a combination 408 of twenty five tons of L-cobalt ore and forty tons of A-cobalt ore from a second LSM 410. The first trader 406 can, accordingly, sell a total of 150 tons 412 of cobalt ore to a first smelter 414. The 150 tons 412 of cobalt ore are in a ratio 416 of 50% L-cobalt ore to 50% A-cobalt ore. After smelting, the 150 tons 412 of cobalt ore can have a purity of 60% 418. The first smelter 414 can sell smelted ore to a first refiner 420. The first refiner 420 can also purchase smelted ore from a second smelter 422. The ore from the second smelter 422 can be in a different ratio of L-cobalt ore to A-cobalt ore than the ratio 416, such as a ratio 424 of 75:25. The second smelter 422 may have purchased two lots 426 and 428 of ore from a second trader 430, who received the lots 426 and 428 from a third LSM 432 and a fourth LSM 434, respectively.

The first refiner 420 can sell purified cobalt ore (e.g., at a purity level of 100% 436) to a manufacturer 438. The manufacturer 438 may also purchase purified ore from a second refiner 440, with the ore having come indirectly from a third smelter 442, a third trader 444, and a fifth LSM 446.

The ore from the second refiner 440 may be in a different ratio 448 of L-cobalt ore to A-cobalt ore than a ratio 450 of ore from the first refiner 420. The manufacturer can be informed of an overall ratio 452 of 80% to 20% L-cobalt ore to A-cobalt ore, and can advertise the overall ratio 452 in association with a manufactured product. The overall ratio 452 can depend on a number of factors, since different participants can combine different lots of cobalt ore, after or before smelting, refining, or trading, for example.

FIG. 5 illustrates example blockchain entries 500 for a cobalt mining and purification process. Various blockchain entries can be entered by different participants, for different stages of cobalt mining, processing, and use in product manufacturing. For example, for a mining stage 502, a LSM 504 can write, for LSM and ASM mining, a blockchain entry 506 that includes one or more of a miner identifier, a mine identifier, an ore lot number (of a lot identified for sale), an ore amount, and an ore type (e.g., L-ore or A-ore).

For a trading stage 508, a trader 510 can write, for trader purchase and/or trader lot combining steps, a blockchain entry 512 that includes one or more of a trader identifier, miner identifier(s) (e.g., of purchased lot(s), inbound ore lot number(s) of purchased lot(s), an outbound lot number of a lot identified for sale, and ore amount(s) (e.g., in inbound and/or outbound lots).

As another example, for a smelting stage 514, a smelter 516 can, for lot purchase and/or lot sales, write a blockchain entry 518 that includes one or more of a smelter identifier, trader identifier(s), inbound ore lot number(s), an outbound cobalt lot number, ore/cobalt amount(s) (of inbound and/or outbound lots), and purity level(s).

A refiner 520 can, for a refining stage 522 and for lot purchases/sales, write a blockchain entry that includes one or more of a refiner identifier, smelter identifier(s), inbound cobalt lot number(s), an outbound cobalt lot number, cobalt amounts, and purity level(s).

In a manufacturing stage 526, a manufacturer 528 can write a blockchain entry 530 that includes one or more of a manufacturer identifier, refiner identifier(s), inbound cobalt lot number(s), a product lot number, a purity level, an cobalt amount (per product or lot), and a claimed L-to-A cobalt ratio. Although the described entries can be un-encrypted, in some implementations and as further described below, blockchain entries can be encrypted, for privacy, using a producer-specific cryptosystem.

Figure 6:
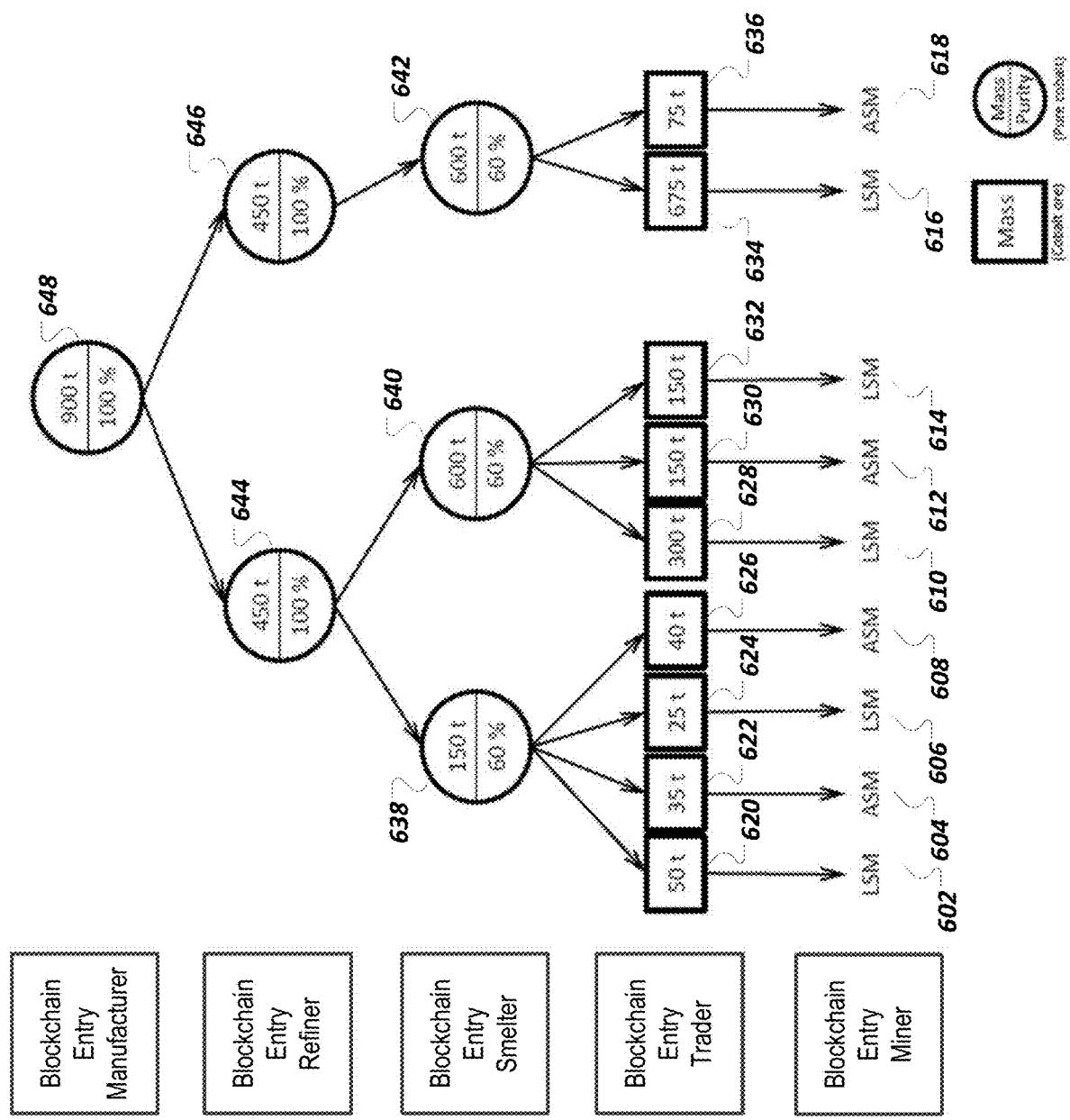
FIG. 6 illustrates an example cobalt provenance verification based on a blockchain for a cobalt mining and purification process.

FIG. 6 illustrates an example cobalt provenance verification based on a blockchain 600 for a cobalt mining and purification process. Various miners can write blockchain entries 602, 604, 606, 608, 610 612, 614, 616, and 618 for various ore lots, with some ore lots mined by LSM miners and some lots mined by ASM miners. Traders can write blockchain entries 620, 622, 624, 626, 628, 630, 632, 634, and 636 that correspond to lot purchases from miners or lot combining to create aggregated lots for sale to smelters. Smelters can write blockchain entries 638, 640, and 642 that correspond to lot purchases from traders smelting activities, or sales of smelted ore to refiners. Refiners can write blockchain entries 644 and 646 that correspond to lot purchases from smelters, refining activity, or sales of purified ore to a manufacturer. A manufacturer can write a blockchain entry 648 that includes a claimed ratio of L-cobalt ore to A-cobalt cobalt.

A verifier can traverse the cobalt and cobalt-ore lots used in the cobalt mining and purification process and represented in the blockchain 600. Traversal and verification can be possible since each blockchain entry can include the lot numbers that were used in a respective production step. Therefore, the verifier can determine which lots were used by the manufacturer, refiners, smelters, and traders as well as which LSM or ASM mined the cobalt ore. In the given example, the LSM cobalt used by the manufacturer corresponds to blockchain entries 620, 624, 628, 632, and 634, of amounts of fifty, twenty five, three hundred, one hundred fifty, and six hundred seventy five tons, respectively, for a LSM total of twelve hundred tons. The ASM cobalt used by the manufacturer corresponds to blockchain entries 622, 626, 630, and 636 of thirty five, forty, one hundred fifty, and seventy five tons, respectively, for an ASM total of 300 tons. The verifier can verify whether a LSM-to-LSM ratio of 80% LSM matches a claimed ratio, for example. As mentioned, although the described entries can be un-encrypted, in some implementations and as further described below, blockchain entries can be encrypted, for privacy, using a producer-specific cryptosystem, and verified using a homomorphic protocol.

FIG. 7 illustrates a protocol specification 700 for a privacy-preserving provenance verification protocol 702. The protocol 702 includes two rounds—a block creation round 704 and a verification round 706. The block creation round 704 includes one step 708. The verification round 706 includes ten steps 710, 712, 714, 716, 718, 720, 722, 724, 726, and 728. The steps of the protocol 702 are described in detail below with respect to FIGS. 8-10.

FIG. 8 is a swim lane diagram of an example method 800 for verifying encrypted data provider data on a public storage medium. A second re-encryption party $R_2$ 801 has an asymmetric HE cryptosystem $CS_{R_2}=(E_{R_2}, D_{R_2}, G_{R_2})$ with a key pair ($pk_{R_2}$, $sk_{R_2}$). Each data provider $P_i$ 802 of a supply chain has an instance of a block cipher, e.g., AES, $CS_{P_i}=(E_{P_i}, D_{P_i}, G_{P_i})$ with a secret key $sk_{P_i}$. A customer C 803 has an instance of a blockcipher, e.g., AES, $CS_C=(E_C, D_C, G_C)$ with a secret key $sk_C$.

The second re-encryption party $R_2$ 801 (e.g., second of two re-encryption parties) provides public key $pk_{R_2}$ copies 804, 806, 808, and 810 of a homomorphic cryptosystem to each data provider (e.g., supply chain participant) 802, a first re-encryption party $R_1$ 814, an arithmetic party A 816, and the customer C 803, respectively. The public key $pk_{R_2}$ can be referred to as a re-encryption-party public key. The customer C 803 can be a verifying entity that wants to verify data provided by the data providers $P_i$, for example.

Each data provider $P_i$ 802 encrypts a secret key $sk_{P_i}$ of a data-provider-specific cryptosystem with the primary key $pk_{R_2}$ obtained from the second re-encryption party 801 and sends a respective encrypted secret key $E_{R_2}(sk_{P_i})$ 820 to the first re-encryption party $R_1$ 814. The customer C 803 encrypts a secret key $sk_C$ of a customer cryptosystem with the primary $pk_{R_2}$ received from the second re-encryption party 801, and sends an encrypted secret key $E_{R_2}(sk_C)$ 822 to the arithmetic party A 816.

In each production step, a data provider (e.g., supply chain participant) $P_i$ 802 can encrypt its data (e.g., supply chain data) $x_j$ with its secret key $sk_{P_i}$ to obtain a ciphertext $E_{P_i}(x_j)$ 823. The data provider $P_i$ 802 stores the ciphertext $E_{P_i}(x_j)$ 823 on a blockchain 824.

As part of a verification protocol, the customer C 803 determines target function information 826 $f(\bullet)$. At 828, the customer C 803 sends the target function information $f(\bullet)$ to the first re-encryption party $R_1$ 814. The target function $f(\bullet)$ information informs the first re-encryption party $R_1$ 814 which entries of the blockchain 824 (e.g., which indices ( . . . , j, . . . )) can be used for a verification.

At 830, the first re-encryption party $R_1$ 814 uses the received target function information to identify block chain entries of the blockchain 824 to be used for verification and retrieves the identified blockchain entries. At 832, the first re-encryption party $R_1$ 814 further encrypts the encrypted data-provider-specific data using the re-encryption-party public key of the second re-encryption proxy $R_2$ 801 to generate doubly-encrypted data-provider-specific data that is encrypted by both the data-provider-specific cryptosystem and the homomorphic cryptosystem.

At 834, the first re-encryption party $R_1$ 814 re-encrypts, using the homomorphic cryptosystem, the doubly-encrypted data-provider-specific data to generate second encrypted data-provider-specific data ($\ldots, E_{R_2}(x_j)$) that is encrypted by the homomorphic cryptosystem and no longer encrypted by the data-provider-specific cryptosystem.

At 836, the first re-encryption party $R_1$ 814 sends the second encrypted data-provider-specific data ($\ldots, E_{R_2}(x_j)$) to the arithmetic party A 816.

At 838, the arithmetic party A 816 homomorphically computes a first encrypted target function result $E_{R_2}$ ($\varphi = f(\ldots, E_{R_2}(x_j), \ldots)$) using the second encrypted data-provider-specific data. The first encrypted target function result is encrypted using the homomorphic cryptosystem.

At 840, the arithmetic party A 816 further encrypts the first encrypted target function result to generate a doubly-encrypted target function result $E_{R_2}(E_C(\rho))$ that is encrypted by both the homomorphic cryptosystem and the verifier cryptosystem. The encryption can be denoted as $E_{R_2}(E_C(\rho)) = R(E_C(\bullet), E_{R_2}(\varphi, E_{R_2}(sk_C))$, utilizing a re-encryption function R.

At 842, the arithmetic party A 816 sends the doubly-encrypted target function result to the second re-encryption party $R_2$ 801.

At 844, the second re-encryption party $R_2$ 801 decrypts, using the homomorphic cryptosystem, the doubly-encrypted target function result $E_{R_2}(E_C(\rho))$ to generate a second encrypted target function result $E_C(\rho)$ that is encrypted by the customer cryptosystem and no longer encrypted by the homomorphic cryptosystem.

At 846, the second re-encryption party $R_2$ 801 sends the second encrypted target function result $E_C(\rho)$ to the customer C 803.

At 848, the customer C 803 decrypts the second encrypted target function result $E_C(\rho)$ to generate a target function result $\rho$. The customer C 803 can verify the target function result $\rho$, for example. For instance the target function result $\rho$ may be a computed ASM-to-LSM-cobalt ratio and the customer C 803 can compare the computed ASM-to-LSM-cobalt ratio to a claimed ASM-to-LSM-cobalt ratio, e.g., to determine whether the computed ASM-to-LSM-cobalt ratio matches the claimed ASM-to-LSM-cobalt ratio.

Figure 9:
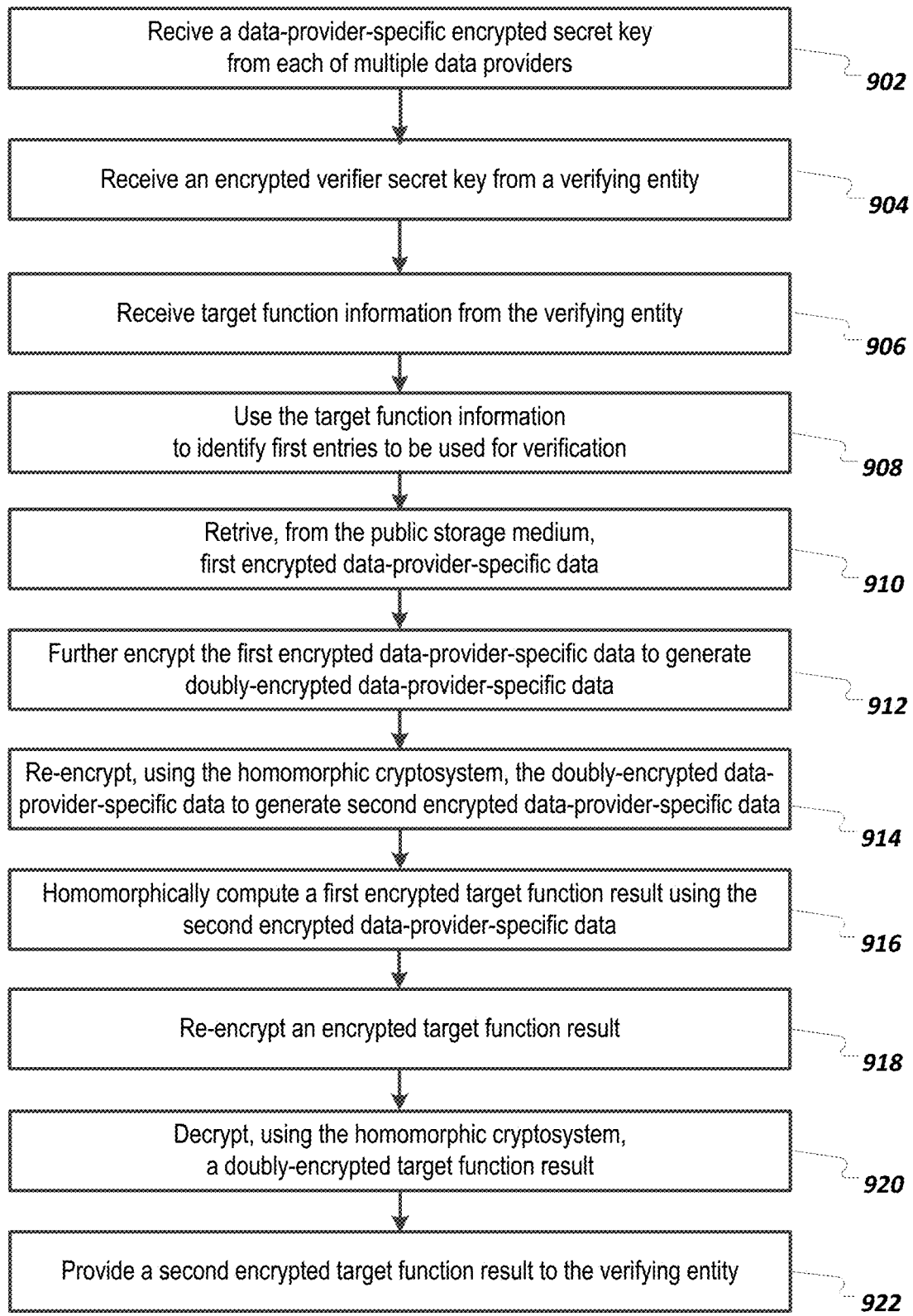
FIGS. 9 and 10 are flowcharts of example methods for verifying encrypted data provider data on a public storage medium.

FIG. 9 is a flowchart of an example method 900 for verifying encrypted data provider data on a public storage medium. It will be understood that the method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the server 102 of FIG. 1.

At 902, a data-provider-specific encrypted secret key is received, from each of multiple data providers. Data providers can be supply chain participants, for example.

At 904, an encrypted verifier secret key is received, from a verifying entity. The verifying entity can be a customer who wants to verify an attribute of a product produced at least in part by products provided by the supply chain participants.

At 906, target function information is received, from the verifying entity, that indicates which entries of a public storage medium include data to be used for a verification of data provider data.

At 908, the target function information is used to identify first entries to be used for verification.

At 910, first encrypted data-provider-specific data, is retrieved, from the public storage medium, from the identified first entries.

At 912, the first encrypted data-provider-specific data is further encrypted to generate doubly-encrypted data-provider-specific data that is encrypted by both the data-provider-specific cryptosystem and the homomorphic cryptosystem.

At 914, the doubly-encrypted data-provider-specific data is re-encrypted, using the homomorphic cryptosystem, to generate second encrypted data-provider-specific data that is encrypted by the homomorphic cryptosystem and no longer encrypted by the data-provider-specific cryptosystem.

At 916, a first encrypted target function result is homomorphically computed using the second encrypted data-provider-specific data. The first encrypted target function result is encrypted, after the computing has been performed, by the homomorphic cryptosystem.

At 918, the first encrypted target function result is re-encrypted to generate a doubly-encrypted target function result that is encrypted by both the homomorphic cryptosystem and the verifier cryptosystem.

At 920, the doubly-encrypted target function result is decrypted, using the homomorphic cryptosystem, to generate a second encrypted target function result that is encrypted by the verifier cryptosystem and no longer encrypted by the homomorphic cryptosystem.

At 922, the second encrypted target function result is provided to the verifying entity to enable the verifying entity to decrypt the second encrypted target function result using the verifier cryptosystem and verify a target function result.

Figure 10:
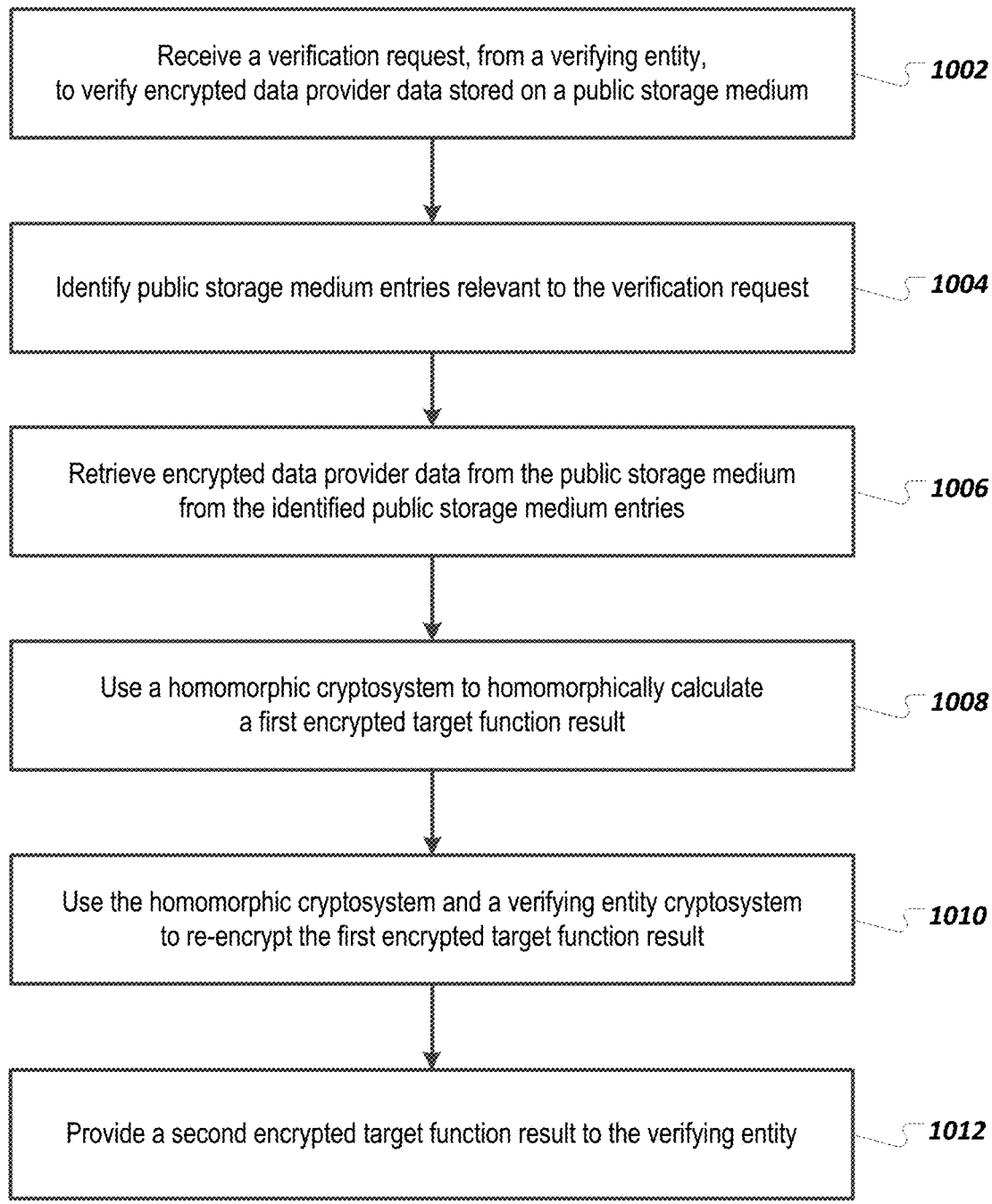

FIG. 10 is a flowchart of an example method 1000 for verifying encrypted data provider data on a public storage medium. It will be understood that the method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002, a verification request is received, from a verifying entity, to verify encrypted data provider data stored on a public storage medium.

At 1004, public storage medium entries relevant to the verification request are identified.

At 1006, encrypted data provider data is retrieved from the public storage medium from the identified public storage medium entries.

At 1008, a homomorphic cryptosystem is used to homomorphically calculate a first encrypted target function result based on the encrypted data provider data. The first encrypted target function result is encrypted under the homomorphic cryptosystem.

At 1010, the homomorphic cryptosystem and a verifying entity cryptosystem are used to re-encrypt the first encrypted target function result to generate a second encrypted target function result. The second encrypted target function result is encrypted under the verifying entity cryptosystem and not (e.g., no longer) encrypted under the homomorphic cryptosystem.

At 1012, the second encrypted target function result is provided, to the verifying entity, to enable the verifying entity to decrypt the second encrypted target function result and verify a target function result. The verifying entity can decrypt the second encrypted target function result using the verifying entity cryptosystem.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented system for verifying encrypted public storage medium data comprising:
   a verifying entity, wherein the verifying entity comprises a verifier cryptosystem comprising a verifier public key and a verifier secret key;
   at least one data provider, wherein each data provider comprises a data-provider-specific cryptosystem comprising a data-provider-specific secret key;
   a first re-encryption party;
   a second re-encryption party, wherein the second re-encryption party comprises a homomorphic cryptosystem comprising a re-encryption-party public key and a re-encryption-party secret key;
   an arithmetic party; and
   a public storage medium;
      wherein the verifying entity, each data provider, the first re-encryption party, the second re-encryption party, and the arithmetic party each comprise at least one computing device; and
      wherein each data provider is configured to:
         encrypt the data-provider-specific secret key using the re-encryption-party public key; and
         send the encrypted data-provider secret key to the first re-encryption party;
   wherein the second re-encryption party is configured to send the re-encryption-party public key to the first re-encryption party, the verifier verifying entity, each data provider, and the arithmetic party;
   wherein the first re-encryption party is configured to:
      receive, from each data provider, the encrypted data-provider secret key; and
      receive, from the second re-encryption party, the re-encryption-party public key;
   wherein the verifying entity is configured to:
      receive, from the second re-encryption party, the re-encryption-party public key;
      encrypt the verifier secret key using the re-encryption-party public key; and
      send the encrypted verifier secret key to the arithmetic party; and
   wherein the arithmetic party is configured to:
      receive, from the second re-encryption party, the re-encryption-party public key; and
      receive, from the verifier, the encrypted verifier secret key;
   wherein each data provider is further configured to:
      encrypt, using the data-provider-specific secret key, data-provider-specific data; and
      store, in the public storage medium, first encrypted data-provider-specific data as first entries;
   wherein the verifying entity is further configured to:
      determine, from the public storage medium, target function information that indicates which entries of the public storage medium include data to be used for verification; and
      send the target function information to the first re-encryption party;
   wherein the first re-encryption party is further configured to:
      receive, from the verifying entity, the target function information;
      use the target function information to identify the first entries to be used for verification;
      retrieve, from the public storage medium, first encrypted data-provider-specific data, from the identified first entries;
      further encrypt the first encrypted data-provider-specific data using the re-encryption-party public key to generate doubly-encrypted data-provider-specific data that is encrypted by both the data-provider-specific cryptosystem and the homomorphic cryptosystem; and
      re-encrypt, using the homomorphic cryptosystem, the doubly-encrypted data-provider-specific data to generate second encrypted data-provider-specific data that is encrypted by the homomorphic cryptosystem and no longer encrypted by the data-provider-specific cryptosystem; and
      provide the second encrypted data-provider-specific data to the arithmetic party;
   wherein the arithmetic party is further configured to:
      receive the second encrypted data-provider-specific data from the first re-encryption party;
      homomorphically compute a first encrypted target function result using the second encrypted data-provider-specific data, wherein the first encrypted target function result is encrypted using the homomorphic cryptosystem; and further encrypt the encrypted target function result to generate a doubly-encrypted target function result that is encrypted by both the homomorphic cryptosystem and the verifier cryptosystem; and send the doubly-encrypted target function result to the second re-encryption system;

wherein the second re-encryption system is further configured to:

receive, from the arithmetic party, the doubly-encrypted target function result;

decrypt, using the homomorphic cryptosystem, the doubly-encrypted target function result to generate a second encrypted target function result that is encrypted by the verifier cryptosystem and no longer encrypted by the homomorphic cryptosystem; and send the second encrypted target function result to the verifying entity; and wherein the verifying entity is further configured to:

receive, from the second re-encryption system, the second encrypted target function result; and decrypt, using the verifier secret key, the second encrypted target function result, to generate a target function result;

verify the target function result.

2. The system of claim 1, wherein the data providers are supply chain participants.

3. The system of claim 2, wherein the target function represents a ratio of a first supply chain value to a second supply chain value.

4. The system of claim 3, wherein the ratio is an amount of artisinally-mined cobalt used in a product divided by an amount of large-scale mined cobalt used in the product.

5. The system of claim 1, wherein values of the data-provider-specific data are not revealed to the verifying entity, the first re-encryption part, the second re-encryption party, or the arithmetic party.

6. The system of claim 1, wherein identifiers of the data-providers are not revealed to the verifying entity, the first re-encryption part, the second re-encryption party, or the arithmetic party.

7. The system of claim 1, wherein the homomorphic cryptosystem supports additive and multiplicative homomorphic operations.

8. The system of claim 1, wherein the public storage medium comprises a blockchain.

9. A computer-implemented method comprising:

receiving, from each of multiple data providers, a data-provider-specific encrypted secret key;

receiving, from a verifying entity, an encrypted verifier secret key;

receiving, from the verifying entity, target function information that indicates which entries of a public storage medium include data to be used for a verification of data provider data;

using the target function information to identify first entries to be used for verification;

retrieving, from the public storage medium, first encrypted data-provider-specific data, from the identified first entries;

further encrypting the first encrypted data-provider-specific data to generate doubly-encrypted data-provider-specific data that is encrypted by both the data-provider-specific cryptosystem and the homomorphic cryptosystem; and re-encrypting, using the homomorphic cryptosystem, the doubly-encrypted data-provider-specific data to generate second encrypted data-provider-specific data that is encrypted by the homomorphic cryptosystem and no longer encrypted by the data-provider-specific cryptosystem;

homomorphically computing a first encrypted target function result using the second encrypted data-provider-specific data, wherein the first encrypted target function result is encrypted using the homomorphic cryptosystem;

re-encrypting the first encrypted target function result to generate a doubly-encrypted target function result that is encrypted by both the homomorphic cryptosystem and the verifier cryptosystem;

decrypting, using the homomorphic cryptosystem, the doubly-encrypted target function result to generate a second encrypted target function result that is encrypted by the verifier cryptosystem and no longer encrypted by the homomorphic cryptosystem; and providing the second encrypted target function result to the verifying entity to enable the verifying entity to decrypt the second encrypted target function result using the verifier cryptosystem and verify a target function result.

10. The method of claim 9, wherein the data providers are supply chain participants.

11. The method of claim 10, wherein the target function result represents a ratio of a first supply chain value to a second supply chain value.

12. The method of claim 11, wherein the ratio is an amount of artisinally-mined cobalt used in a product divided by an amount of large-scale mined cobalt used in the product.

13. The method of claim 9, wherein the second encrypted target function result is generated without revealing unencrypted data provider values.

14. The method of claim 10, wherein the second encrypted target function result is generated without revealing data provider identities.

15. The method of claim 9, wherein the public storage medium comprises a blockchain.

16. A computer program product encoded on a non-transitory storage medium, the product comprising non-transitory, computer readable instructions for causing one or more processors to perform operations comprising:

receiving a verification request, from a verifying entity, to verify encrypted data provider data stored on a public storage medium;

identifying public storage medium entries relevant to the verification request;

retrieving encrypted data provider data from the public storage medium from the identified public storage medium entries;

using a homomorphic cryptosystem to homomorphically calculate a first encrypted target function result based on the encrypted data provider data, wherein the first encrypted target function result is encrypted under the homomorphic cryptosystem;

using the homomorphic cryptosystem and a verifying entity cryptosystem to re-encrypt the first encrypted target function result to generate a second encrypted target function result, wherein the second encrypted target function result is encrypted under the verifying entity cryptosystem and not encrypted under the homomorphic cryptosystem; and providing the second encrypted target function result, to the verifying entity, to enable the verifying entity to decrypt the second encrypted target function result and verify a target function result.

17. The computer program product of claim 16, wherein the data providers are supply chain participants.

18. The computer program product of claim 17, wherein the target function result represents a ratio of a first supply chain value to a second supply chain value.

19. The computer program product of claim 16, wherein the second encrypted target function result is generated without revealing unencrypted data provider values.

20. The computer program product of claim 16, wherein the public storage medium comprises a blockchain.

* * * * *